US012766069B2

(12) United States Patent
Witt

(10) Patent No.: US 12,766,069 B2
(45) Date of Patent: Oct. 20, 2026

(54) STIMULATION DEVICE

(71) Applicant: EIS GmbH, Bielefeld (DE)

(72) Inventor: Florian Witt, Wentorf (DE)

(73) Assignee: EIS GmbH, Bielefeld (DE)

( * ) Notice: Subject to any disclaimer, the term of this patent is extended or adjusted under 35 U.S.C. 154(b) by 967 days.

(21) Appl. No.: 18/060,230

(22) Filed: Nov. 30, 2022

(65) Prior Publication Data

US 2023/0172793 A1 Jun. 8, 2023

(30) Foreign Application Priority Data

Nov. 30, 2021 (DE) ......................... 202021106540.0

(51) Int. Cl.
*A61H 19/00* (2006.01)
*A61H 9/00* (2006.01)

(52) U.S. Cl.
CPC ........... *A61H 19/34* (2013.01); *A61H 9/0007* (2013.01); *A61H 9/0021* (2013.01); *A61H 9/0071* (2013.01); *A61H 2201/0153* (2013.01); *A61H 2201/123* (2013.01); *A61H 2201/1246* (2013.01); *A61H 2201/1685* (2013.01); *A61H 2201/5053* (2013.01); *A61H 2201/5064* (2013.01); *A61H 2201/5071* (2013.01)

(58) Field of Classification Search
None
See application file for complete search history.

(56) References Cited

U.S. PATENT DOCUMENTS

| | | | | |
|---|---|---|---|---|
| 5,003,966 A * | 4/1991 | Saka | A61H 9/005 601/13 |
| 5,243,968 A | 9/1993 | Byun | |
| 6,099,463 A * | 8/2000 | Hockhalter | A61H 9/005 600/38 |
| 11,103,418 B2 | 8/2021 | Lenke | |

(Continued)

FOREIGN PATENT DOCUMENTS

| | | |
|---|---|---|
| DE | 202013012252 U | 11/2015 |
| DE | 202013012252 U1 | 11/2015 |

(Continued)

OTHER PUBLICATIONS

Search Report issued in International Application No. PCT/EP2022/083911, mailed Mar. 2, 2023.

(Continued)

*Primary Examiner* — Thaddeus B Cox
(74) *Attorney, Agent, or Firm* — Bookoff McAndrews, PLLC

(57) ABSTRACT

A stimulation device is described having a pressure field generating device which has a cavity and a medium influencing arrangement. The stimulation device uses a first check valve arrangement, arranged inside the cavity between the application opening and the medium-influencing arrangement, and is movable at least in sections in the direction of the application opening and away from it and has a first check valve which is designed to close in the direction of the application opening and to open in the direction of the medium influencing arrangement, wherein the cavity has a first section and a second section, and a second check valve arrangement, which connects the first section of the cavity to an outside of the stimulation device and has a second check valve.

26 Claims, 10 Drawing Sheets

(56) References Cited

U.S. PATENT DOCUMENTS

| | | | | |
|---|---|---|---|---|
| 2002/0120219 | A1 | 8/2002 | Hovland et al. | |
| 2016/0022533 | A1 * | 1/2016 | Makower | A61H 23/00<br>601/46 |

FOREIGN PATENT DOCUMENTS

| | | | | | |
|---|---|---|---|---|---|
| DE | 102016105019 | | | 7/2017 | |
| DE | 102016105019 | B3 | | 7/2017 | |
| EP | 3 228 297 | A1 | | 10/2017 | |
| EP | 3705106 | B1 | * | 1/2022 | A61H 19/40 |
| FR | 2746639 | B1 | | 10/1997 | |
| WO | WO-2014081600 | A1 | * | 5/2014 | A61H 9/0057 |
| WO | WO-2018220120 | A1 | * | 12/2018 | A61H 9/0057 |

OTHER PUBLICATIONS

International Search Report and Written Opinion issued in International Application No. PCT/EP2022/083911, dated Mar. 2, 2023, pp. 1-12.

* cited by examiner a b

STIMULATION DEVICE

CROSS REFERENCE TO RELATED APPLICATION(S)

This application claims benefit from German Patent Application 202021106540.0 filed on Nov. 30, 2021, its content being incorporated herein by reference.

The invention relates to a stimulation device for stimulating body parts to be stimulated, in particular erogenous zones such as the clitoris, having a pressure field generating device having a cavity having an application opening to be arranged or placed on or over a body part to be stimulated or an area surrounding the body part to be stimulated, wherein the cavity is delimited by a peripheral side wall, and a medium influencing arrangement acting on a gaseous and/or liquid medium located in the cavity, which are designed to subject the medium to a stimulation profile acting at least in the application opening, which profile is distinguished by a change of a pressure of the medium that changes over time, wherein the pressure forms a pressure field made up of minimum pressures and maximum pressures that alternate over time in relation to a reference pressure, and a drive device which is designed to drive the medium influencing arrangement in such a way that the a change of the pressure takes place between the minimum pressures and the maximum pressures. A device of the type mentioned at the outset is known, for example, from EP 3 228 297 A1. This device contains a cavity that forms a single continuous chamber. The outer end of the cavity opens into an application opening which is surrounded by an edge at the outer end of the cavity. The edge of the application opening is arranged or placed on or over a body part to be stimulated or an area surrounding the body part to be stimulated. The medium influencing arrangement has a membrane as a volume changing element, which closes the cavity at its inner end and is moved by the drive device alternately in the direction of the application opening and in the opposite direction thereto. The reciprocal movement of the membrane driven by the drive device causes a change in the volume of the chamber in such a way that a pressure field made up of minimum and maximum pressures that alternate over time in relation to normal atmospheric pressure or ambient pressure is generated at the application opening and effectuates a stimulation of the body part to be stimulated.

The object of the present invention is to modify a stimulation device of the type mentioned at the outset in such a way that the pressure field made up of alternating minimum pressures and maximum pressures is generated exclusively in the negative pressure range and thus below normal atmospheric pressure.

This object is achieved by a stimulation device for stimulating body parts to be stimulated, in particular erogenous zones such as the clitoris, having a pressure field generating device having

- a cavity having an application opening to be arranged or placed on or over a body part to be stimulated or an area surrounding the body part to be stimulated, wherein the cavity is delimited by a peripheral side wall, and
- a medium influencing arrangement acting on a gaseous and/or liquid medium located in the cavity, which are designed to apply a stimulation profile acting at least in the application opening to the medium, which profile is distinguished by a change of a pressure of the medium that alternates over time, wherein the pressure forms a pressure field made up of minimum pressures and maximum pressures that alternate over time in relation to a reference pressure, and
- a drive device which is designed to drive the medium influencing arrangement in such a way that a change of the pressure takes place between the minimum pressures and the maximum pressures, characterized by

- a first check valve arrangement, which is arranged within the cavity between the application opening and the medium influencing arrangement, sealed off with the side wall of the cavity, and is movable at least in sections in the direction of the application opening and away from it and has a first check valve which is designed to close in the direction of the application opening and to open in the direction of the medium influencing arrangement, wherein the cavity has a first section located between the first check valve arrangement and the medium influencing arrangement and a second section located between the first check valve arrangement and the application opening, and
- a second check valve arrangement, which connects the first section of the cavity to an exterior of the stimulation device and has a second check valve which is designed to close in the direction of the first section of the cavity and to open in the direction of the exterior of the stimulation device.

By the first check valve arrangement, the cavity is divided according to the invention into a first section and a second section. The first section of the cavity is delimited on the one hand by the first check valve arrangement and on the other hand by the medium influencing arrangement, while the second section of the cavity is likewise delimited on the one hand by the first check valve arrangement and on the other hand opens into the application opening. Thus, the medium influencing arrangement acts only on the gaseous and/or liquid medium located in the first section of the cavity. Furthermore, the first check valve arrangement has a certain resilience due to its movable design provided according to the invention, as a result of which it is movable both in the direction of the application opening and in the direction away from it.

The pressure field generating device according to the invention works cyclically to generate a pressure field from minimum pressures and maximum pressures that alternate over time exclusively in the negative pressure range. Each cycle can be divided into a first half of the cycle, in which the relative minimum pressures are generated in the second section of the cavity, and a second half of the cycle, in which the relative maximum pressures are generated in the second section of the cavity. The first check valve of the first check valve arrangement is designed according to the invention to open only in the direction of the medium influencing arrangement. If, at the beginning of the first half of the cycle, the medium in the first section of the cavity is subjected to a negative pressure by the medium influencing arrangement, which in this operating state is lower than the pressure in the second section of the cavity, this results in a movement of the first check valve arrangement in the direction of the medium influencing arrangement and thus away from the application opening and then also in opening of the first check valve, through which part of the medium located in the second section of the cavity is then sucked into the first section of the cavity. This results in a negative pressure in the second section of the cavity, especially in sealing operation, i.e., when the rim of the application opening is placed, essentially forming a seal, on the body part to be stimulated or an area surrounding the body part to be stimulated. The second check valve of the second check valve arrangement is closed because it is designed according to the invention to close in the direction of the first section of the cavity. The negative pressure created in the second section of the cavity exerts a suction effect on the body part to be stimulated.

If, in the subsequent second half of the cycle, the medium influencing arrangement reverses its effect and now applies positive pressure to the medium located in the first section of the cavity, the first check valve in the first check valve arrangement closes. This prevents a part of the medium located in the first section of the cavity from reaching the second section of the cavity. The movable arrangement of the first check valve arrangement has the result that it is now prevented from moving further away from the application opening by the pressure building up in the first section of the cavity, but reverses its movement and is pressed in the direction of the application opening. The increase in pressure in the first section of the cavity then additionally results in opening of the second check valve, which is designed according to the invention to open in the direction of the outside of the stimulation device. Thus, a part of the medium in the first section of the cavity is discharged to the outside via the open second check valve and pressure is thereby discharged from the first section of the cavity, which ultimately results in the elimination of the briefly occurring positive pressure.

If, for the next cycle, the medium influencing arrangement reverses its direction of action again and applies negative pressure to the medium located in the first section of the cavity again, the second check valve of the second check valve arrangement closes immediately and the first half of the next cycle begins again in the above-described manner. Due to the negative pressure that then builds up again in the first section of the cavity, the check valve arrangement is again subjected to a suction pressure and is thereby subjected to a reverse movement again in the direction away from the application opening.

In the steady state in 100% leak-tight operation, after which the application opening is thus placed with its peripheral edge so tightly on the body part to be stimulated or on an area surrounding it that no exchange of medium is possible between the second section of the cavity and the surroundings, negative pressure conditions result in both sections of the cavity, which prevent the two check valves from opening; in this ideal case, the two check valves remain closed and the pulsating negative pressure field generated by the medium influencing arrangement is transmitted from the first section of the cavity exclusively via the movement of the first check valve arrangement to the second section of the cavity. However, experience has shown that this ideal case occurs rather rarely, so that when further medium enters through the application opening into the second section of the cavity, the negative pressure there increases in the direction of normal air pressure and thus causes the first check valve to open again in the first half of the cycle.

By applying an oscillating negative pressure field using the arrangement according to the invention, the body part to be stimulated is sucked in a rhythmic or pulsating form through the application opening into the adjoining second section of the cavity, which results in a special stimulation effect. Although the term "pressure field" usually implies a certain spatial distribution of the pressure, it refers here to the profile over time of the pressure and thus the occurrence of pressure waves that form a pressure field.

A further advantage of the construction according to the invention is easy cleaning, in that the stimulation device is immersed in a cleaning liquid during operation and this forces the cleaning liquid to flow completely through the two sections of the cavity (and thus through the cavity as a whole) and the check valves of the two check valve assemblies without further measures.

Preferred embodiments and refinements of the invention are specified in the dependent claims.

The preferred embodiment of the first and/or second check valve as a lip valve or umbrella valve results in a particularly simple and at the same time effective construction.

Furthermore, the stimulation device preferably has no further valves, in particular in order to avoid undesired pressure losses.

In particular, the reference pressure is the atmospheric ambient pressure that preferably prevails upon beginning operation of the stimulation device.

In a further preferred embodiment, the pressure field can have an essentially sinusoidal-periodic pressure profile, at least in the steady state during operation of the stimulation device.

A further preferred embodiment is distinguished in that the first check valve arrangement has a wall element which is oriented at an angle, preferably substantially transversely or at right angles, to the side wall of the cavity and is arranged sealed off on the side wall of the cavity, at least in sections in the direction of the application opening and is designed to be movable away therefrom and is provided with the first check valve. With the use of such a wall element, a particularly high level of mobility of the first check valve arrangement may be achieved.

Expediently, the first check valve arrangement and the second check valve arrangement together form a preferably replaceable, one-piece component. The combination of the two check valve arrangements in an one-piece component results not only in constructive but also production-related advantages. Another advantage of this embodiment is the easy cleaning possibility, which is provided very easily despite the use of two check valve arrangements and the division of the cavity into two sections. This is because both check valve arrangements are located in the same component, which can be removed and thereby all the cavities of the arrangement become accessible for direct cleaning.

A further preferred embodiment is characterized in that the second section of the cavity is designed as a preferably interchangeable socket, which is provided with the first check valve arrangement and/or the second check valve arrangement. In particular, if the socket is designed to be interchangeable or removable, this embodiment has the advantage of using first and/or second check valve arrangements having different dimensions and/or different valve or opening and closing behavior in adaptation to different requirements for the stimulation. Likewise, this embodiment offers the flexibility of using, instead of a socket provided with the first and/or second check valve arrangement, a socket which differs in its construction from the solution according to the invention and in doing so, in a different structural way, causes a different type of stimulation in particular, for example as in the prior art by generating a pressure field from negative pressures and positive pressures alternating over time in relation to the atmospheric ambient pressure.

In a refinement of this embodiment, the socket, if it is provided with the second check valve arrangement, has a channel which connects the second check valve to the first section of the cavity. Thus, in this refinement, not only the second check valve but also the channel is integrated into the socket, which is advantageous in terms of construction, production, and use.

It is also structurally advantageous if the socket has an inner side wall, which forms a section of the side wall of the cavity leading to the application opening, in order to define the second section of the cavity.

The socket is expediently produced from flexible material, preferably silicone or thermoplastic elastomers. The use of silicone is not only advantageous for reasons of hygiene, but also offers a certain resilience in adapting to the shape of the body part to be stimulated or an area surrounding it, in order to effectuate the most sealing possible placement of the application opening. Thermoplastic elastomers (TPEs) also offer the same advantages, but are more durable and recyclable than silicone.

Another preferred embodiment is distinguished in that the medium influencing arrangement is designed as a volume changing element for changing the volume of the cavity.

One refinement of this embodiment is distinguished in that the cavity is delimited by a side wall, at least one section of the side wall of the cavity delimiting the first section of the cavity is movable, the volume changing element has this movable side wall section and the drive device is designed to set this movable side wall section into a reciprocal movement. The mentioned movable side wall section is preferably a membrane which closes the inner end of the first section of the cavity. In one refinement of the above-mentioned embodiment, the cavity as a whole is provided with the application opening at a first end and is closed by the movable side wall section at a second end, which is preferably opposite.

A further preferred embodiment is distinguished in that the drive device has an electromagnetically operated linear motor having at least one stationary electromagnetic coil element and a magnetic or magnetizable core which is reciprocally movable in relation to the stationary electromagnetic coil element and is designed to drive the medium influencing arrangement.

In one refinement, the core is designed to set the above-mentioned movable side wall section into a reciprocal movement.

An alternative refinement is distinguished in that the core is movably arranged within the first section of the cavity and the volume changing element has the core or is formed by the core, wherein the core is reciprocally movable along the first section of the cavity and/or a cross section of the cavity defined transversely to its length is essentially unchanged or at least almost constant at least over the length of its first section and the core has a corresponding cross section and/or the cavity has the form of a tube at least along its first section. In terms of its construction and function, this alternative refinement is similar, for example, to a bicycle pump or a piston engine.

Alternatively, however, it is also conceivable to provide an electrically operated rotary motor having a gear for the drive device instead of an electromagnetically operated linear motor, which converts the rotation of the output shaft into a reciprocal linear movement to drive the medium influencing arrangement and in particular for a reciprocal movement of the above-mentioned movable wall section.

To facilitate the starting conditions and to reach the steady state more quickly, a venting pump can preferably be used, which is designed to vent the second section of the cavity so that it reaches the negative pressure range more quickly. The venting pump preferably has an inlet which communicates with the second section of the cavity and an outlet which opens out into the environment on the outside of the stimulation device.

One preferred refinement of the above-mentioned embodiment is distinguished by a proximity sensor, which is designed to detect the distance of the application opening from the body part to be stimulated and to emit a signal when the distance falls below a predetermined threshold value, and a control device connected to the proximity sensor and the venting pump, which is designed to activate the venting pump upon receiving the signal from the proximity sensor, wherein preferably the threshold value is zero. With the aid of such a proximity sensor, it is possible to automate deliberate switching on and off of the venting pump, which is advantageous for handling the stimulation device.

A control device connected to the drive device and the venting pump is expediently provided, which is designed to activate the drive device only after activation of the venting pump with a delay of a predetermined period of time. This prevents the medium influencing arrangement driven by the drive device on the one hand and the venting pump on the other hand from being able to work counterproductively against one another.

Alternatively, the use of a pressure sensor is also conceivable, for example, which is designed to detect the pressure within the second section of the cavity and to emit a signal when the pressure is below the prevailing atmospheric ambient pressure, and a control device connected to the pressure sensor, the drive device, and the venting pump, which is designed to activate or keep activated the drive device only when the signal from the pressure sensor is present.

Alternatively, the pressure sensor can be designed to detect the pressure within the second section of the cavity and to emit a signal when the pressure is not below the prevailing atmospheric ambient pressure, and a control device connected to the pressure sensor, the drive device, and the venting pump, which is designed to activate or keep activated the venting pump and to deactivate or keep deactivated the drive device only when the signal from the pressure sensor is present.

The device can expediently be designed as a hand-held device that is preferably electrically operated by a battery.

According to a second aspect of the invention, a socket for a stimulation device of the above-described type is proposed, wherein the socket is removably arrangeable on or in a housing of the stimulation device, forms the second section of the cavity, and is provided with the first check valve arrangement and/or the second check valve arrangement.

First exemplary embodiments from the prior art as comparative examples and then preferred embodiments of the invention are explained in more detail below with reference to the appended drawings. In the figures.

Figure 2:
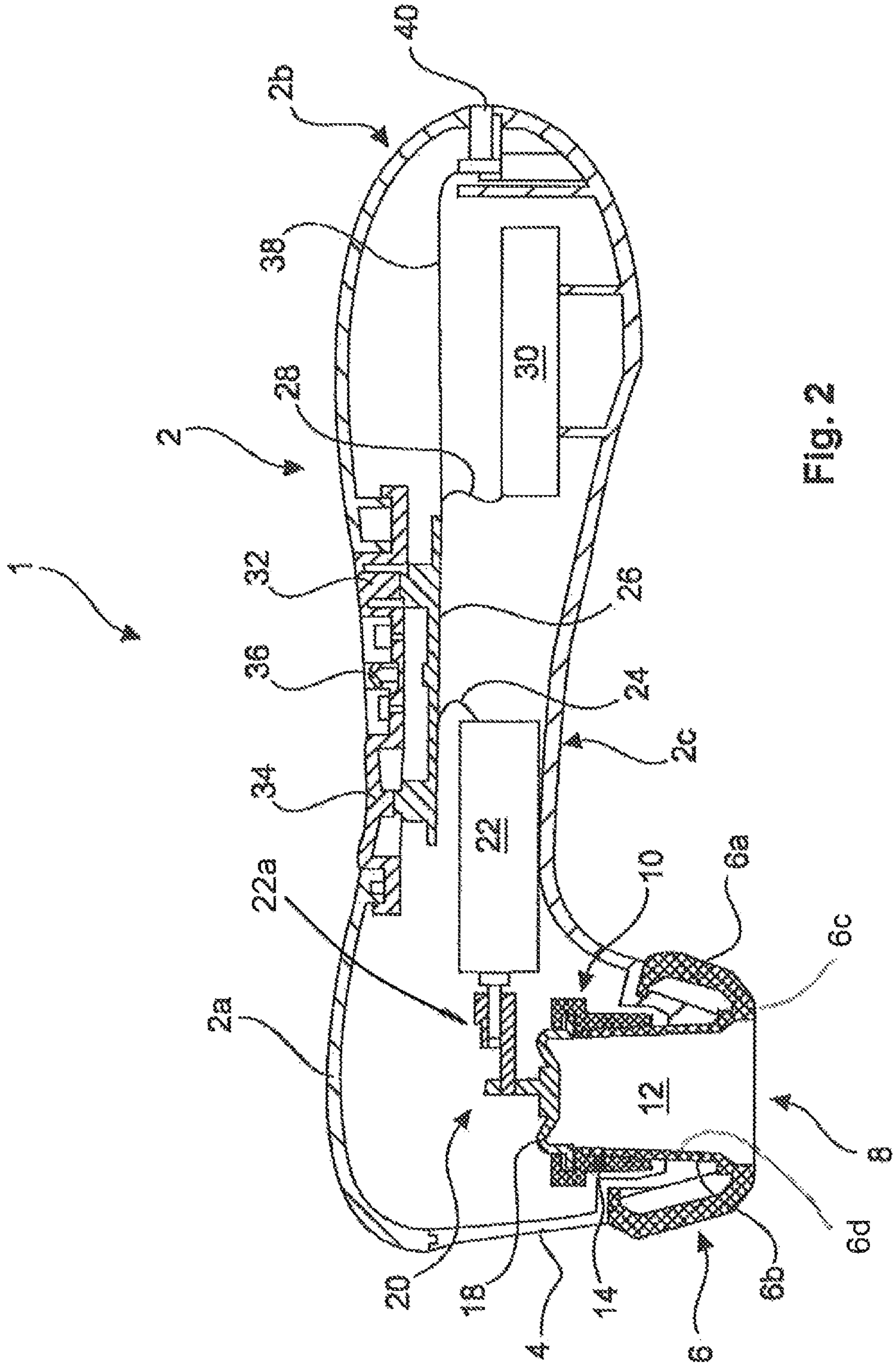
FIG. 2 shows a longitudinal section through the pressure wave massage device from FIG. 1.
Figure 3:
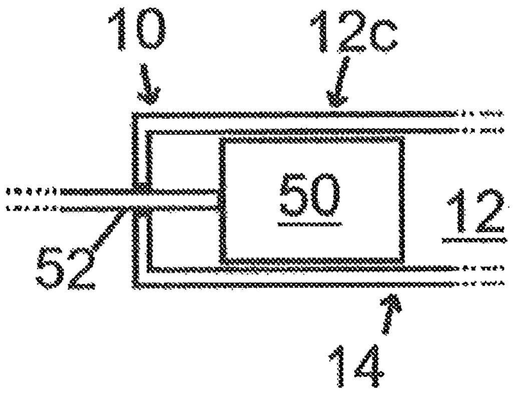
Figure 4:
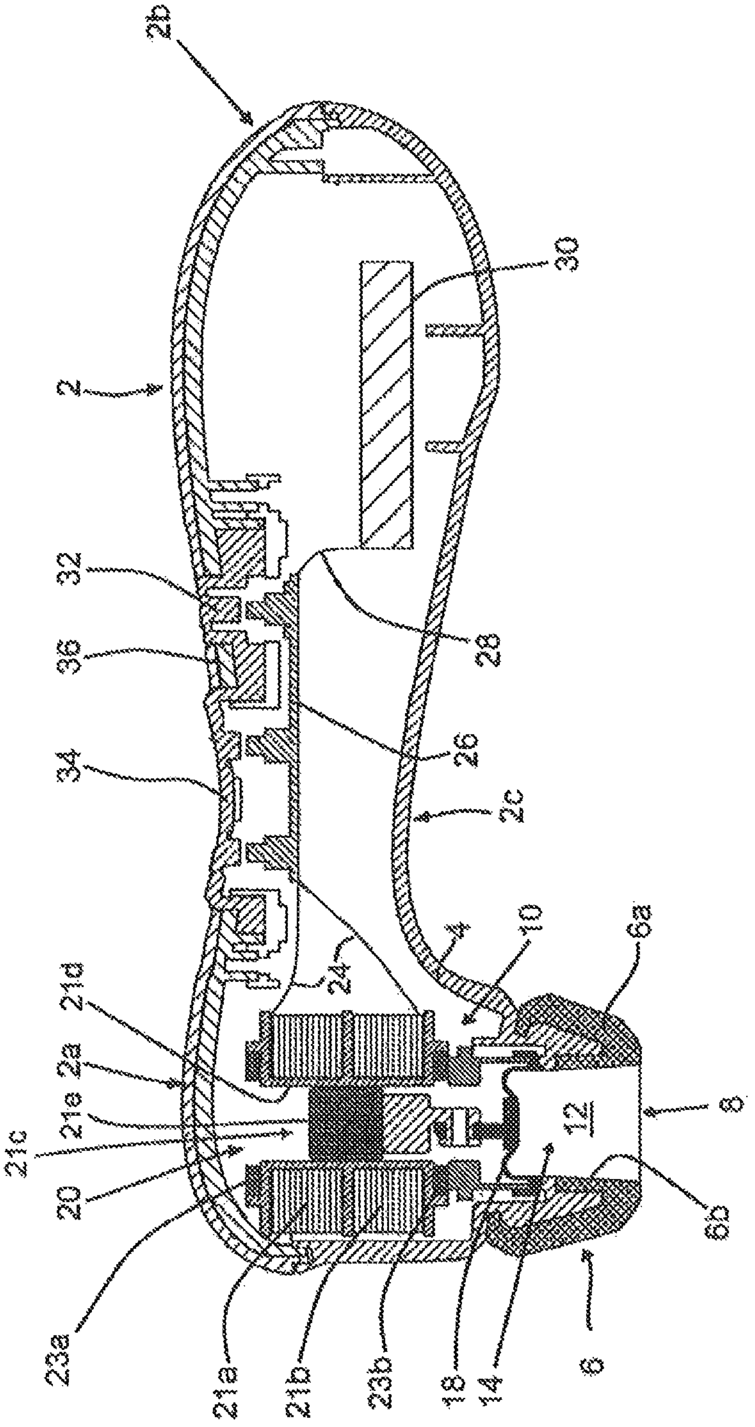
Figure 5:
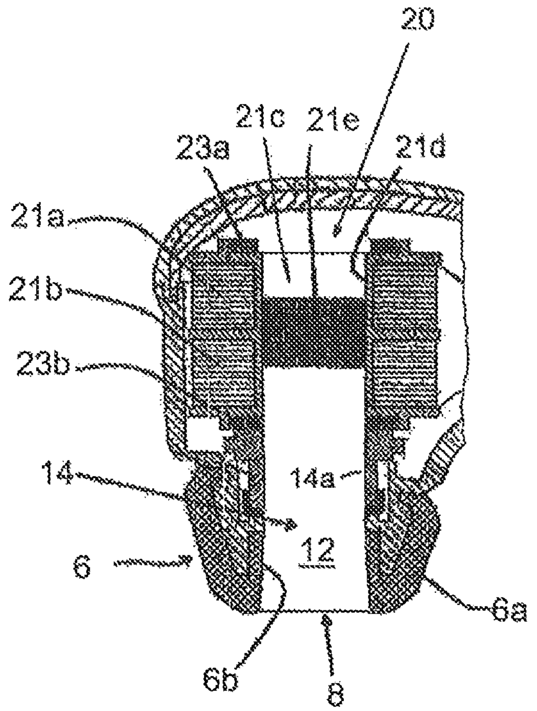
Figure 6:
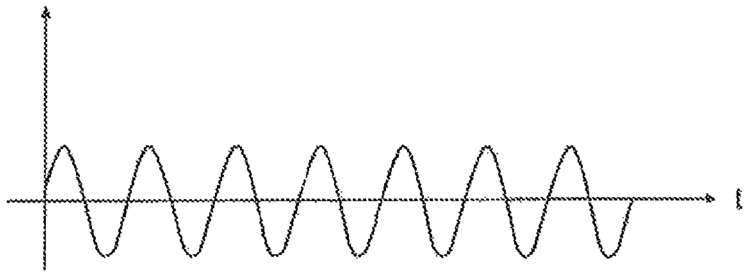
Figure 7:
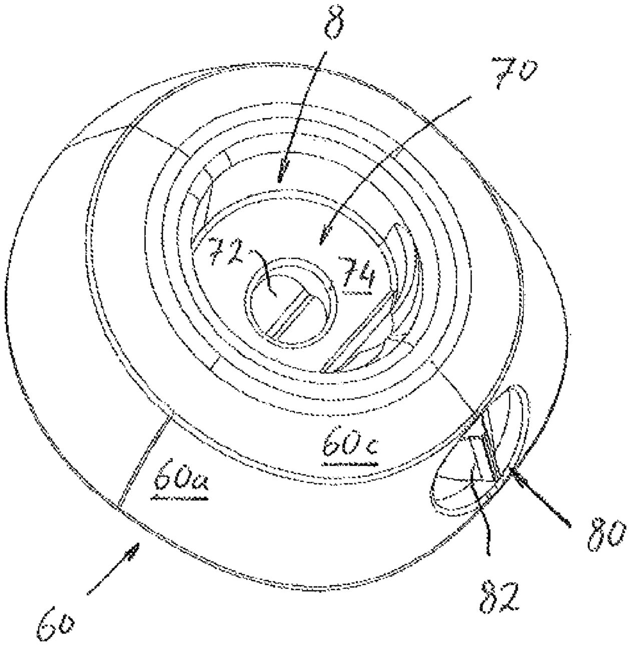
Figure 7:
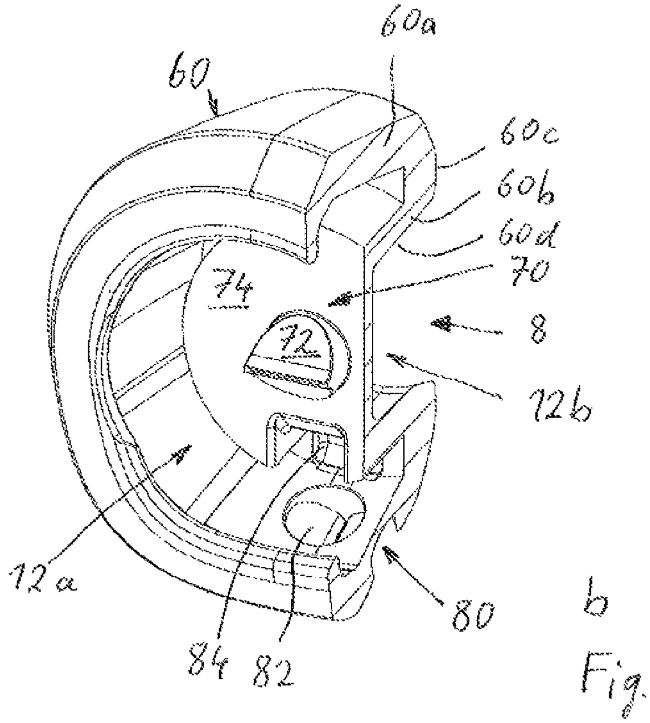
Figure 8:
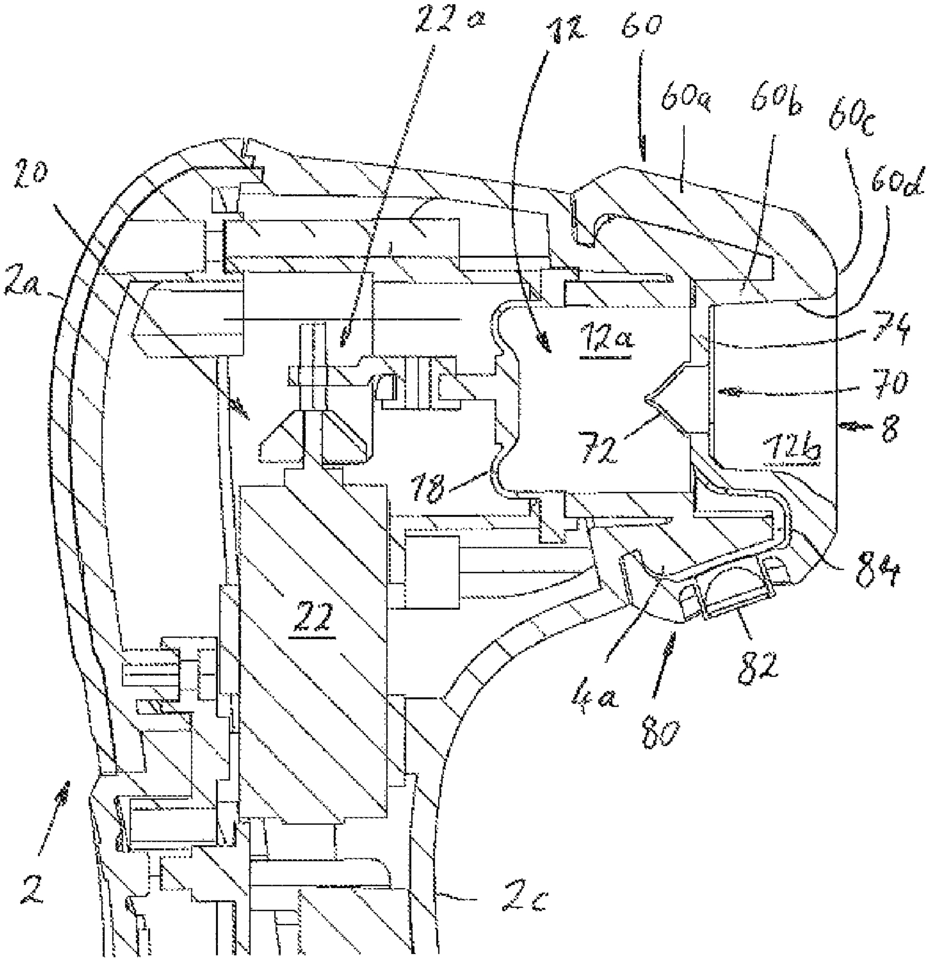
Figure 10:
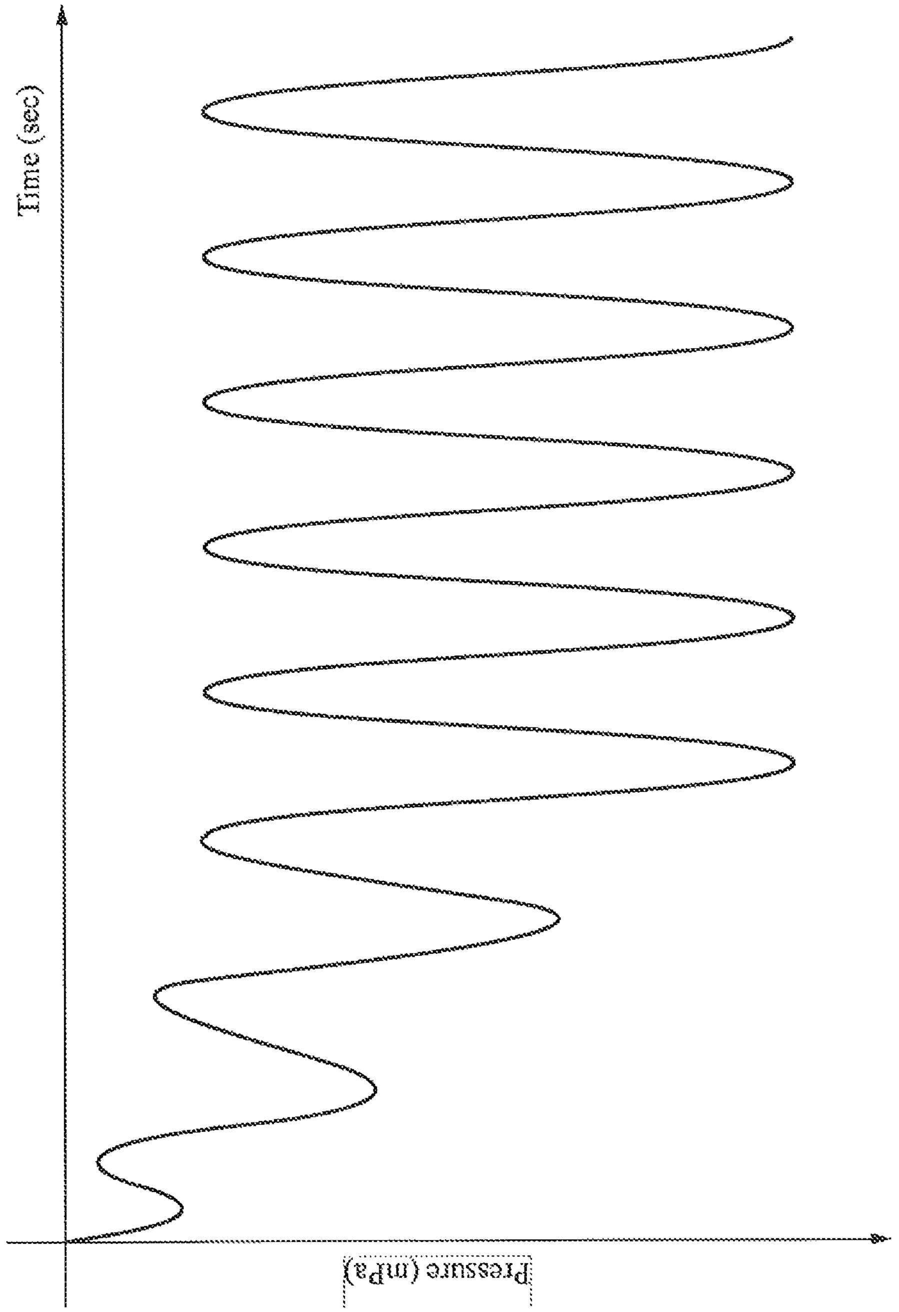
Figure 11:
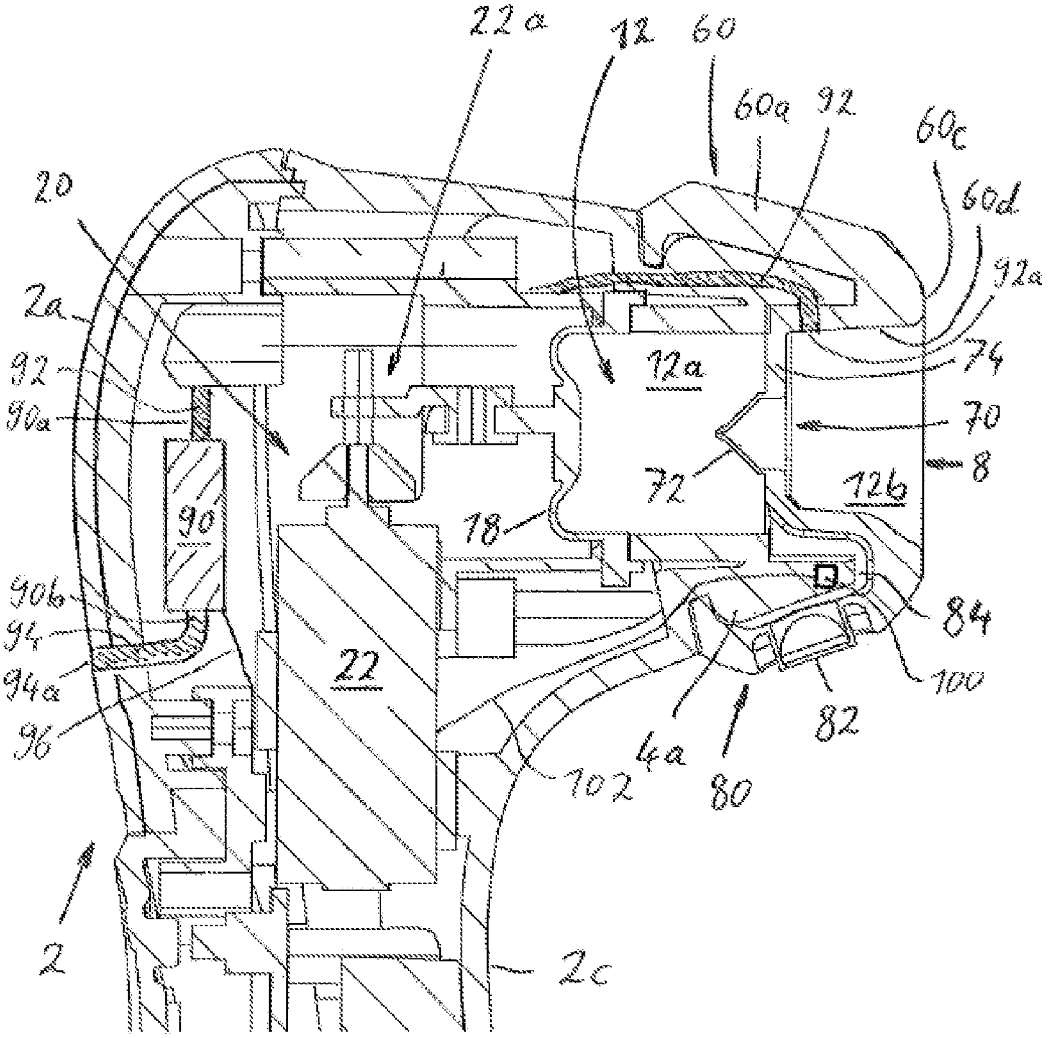

FIG. 3 schematically shows, in a longitudinal sectional representation, an enlarged detail of a part of a pressure field generating device and the cavity of a pressure wave massage device known from the prior art according to a second exemplary embodiment;

FIG. 4 shows a longitudinal section through a pressure wave massage device known from the prior art according to a third exemplary embodiment;

FIG. 5 schematically shows, in a longitudinal sectional representation, an isolated view of an assembly formed by the drive device and the cavity of a pressure wave massage device known from the prior art according to a fourth exemplary embodiment;

FIG. 6 shows a profile of the pressure waves of a medium, such as air in particular, generated by a pressure wave massage device known from the prior art;

FIG. 7 shows, in a perspective front view (a) and a perspective rear view (b) in lateral section, a novel socket according to a preferred embodiment of the invention for use on conventional pressure wave massage devices, as are shown in FIGS. 1 to 5 by way of example;

FIG. 8 shows, in longitudinal section, a detail image of the pressure wave massage device from FIG. 2 in the area of its head having the novel socket according to FIG. 7 fastened on the extension;

FIGS. 9*a* to *h* schematically show, in longitudinal section, a detail of a part of the extension of the pressure wave massage device from FIG. 8 having the novel socket according to FIG. 7 fastened thereon in different operating states;

FIG. 10 shows a profile of the pressure waves of a medium, such as air in particular, generated using the novel socket of FIG. 7; and FIG. 11 shows, in longitudinal section, a detail image of the pressure wave massage device from FIG. 2 in the area of its head having the novel socket according to FIG. 7 fastened on the extension in an embodiment according to the invention expanded and modified with a venting pump and a sensor.

Figure 1:
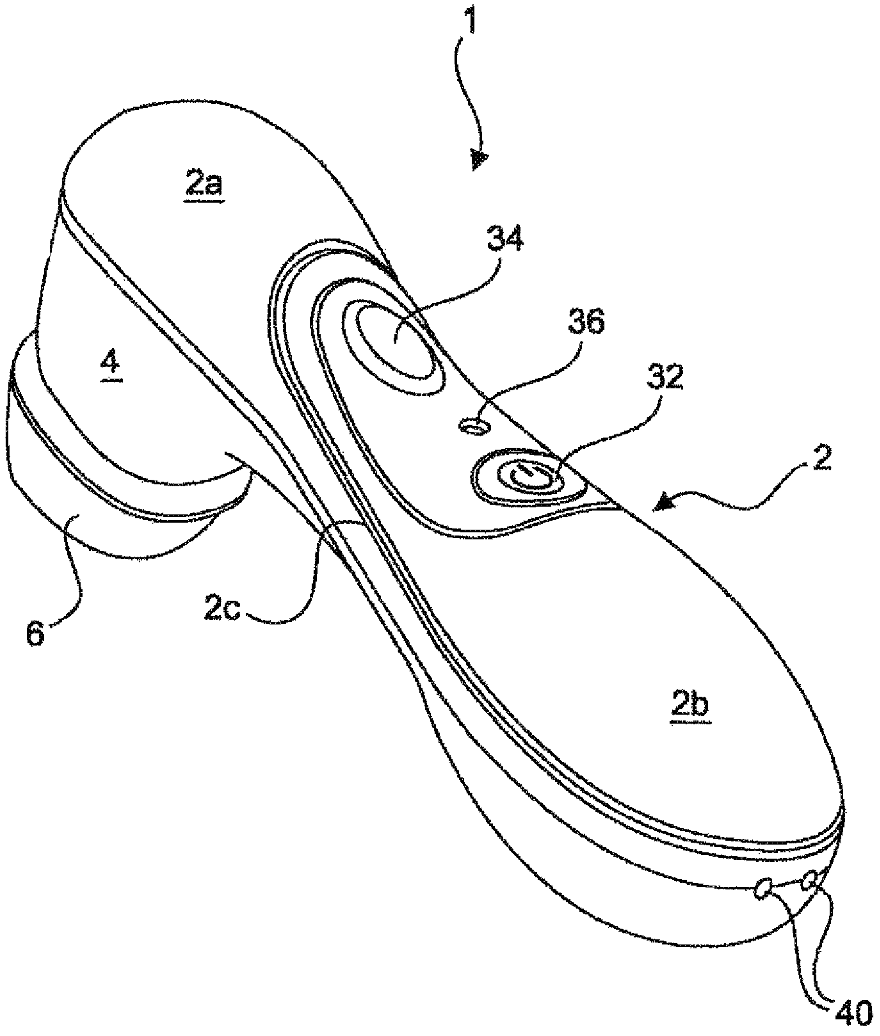
FIG. 1 shows a perspective side view of a pressure wave massage device known from the prior art according to a first exemplary embodiment.

The pressure wave massage device 1 shown in FIGS. 1 and 2 in a first exemplary embodiment and known from the prior art has an elongate housing 2 having a first end section 2*a*, an opposite second end section 2*b*, and a middle section 2*c* lying in between. The housing is preferably produced from plastic. As can be seen from FIGS. 1 and 2, the two end sections 2*a* and 2*b* are rounded and taper slightly towards the middle section 2*c*, which is made somewhat slimmer. A protruding extension 4 extending transversely to the longitudinal extension of the housing 2 is formed on the first end section 2*a* of the housing 2 and, together with the first end section 2*a* of the housing 2, forms a head of the pressure wave massage device 1, while the second end section 2*b* of the housing 2 is preferably used as a handle, to hold the pressure wave massage device 1 during the application to be described in more detail hereinafter.

As FIGS. 1 and 2 in particular furthermore show, a socket 6 containing an application opening 8 is seated on the extension 4. The socket 6 preferably consists of a soft or flexible plastic material such as a silicone material in particular.

In the head of the pressure wave massage device 1 formed by the first end section 2*a* of the housing 2 and the extension 4, a pressure wave generating device 10 is housed, with the aid of which a stimulating pressure field or a stimulating reciprocal air flow is generated in the application opening 8. As can be seen in detail in FIG. 2, the pressure field generating device 10 has a cavity 12 having an outer first end, which at the same time also forms the application opening 8 in the socket 6, and an inner second end opposite to the first end and at a distance from the first end. In the first exemplary embodiment shown, the cavity 12 is formed by a single continuous chamber 14 and is delimited by an inner or side wall connecting its two ends to one another. As can also be seen in FIG. 2, the socket 6 has an outer section 6*a*, using which it is removably fastened on the extension 4, and an inner section 6*b*. The outer section 6*a* and the inner section 6*b* of the socket 6 are connected to one another in the area of the application opening 8, where the socket 6 has an edge section 6*c* surrounding the application opening 8. The inner section 6*b* of the socket 6 has a continuous and uninterrupted inner wall 6*d* and is designed as a sleeve open at both end faces, which is not interrupted by any other components or does not contain any other components and thus forms an uninterrupted passage not disrupted by any other components. The inner wall 6*d* of the socket 6 accordingly forms part of the inner or side wall of the cavity 12 and thus delimits an outer section of the cavity 12 leading to its outer first end. The inner or side wall of the cavity 12 outside of the socket 6 can preferably consist of a substantially rigid material. The application opening 8 having the surrounding edge section 6*c* of the socket 6 forms a plane which, in the exemplary embodiment shown, is oriented essentially transversely with respect to the longitudinal axis of the cavity 12, wherein the orientation can fundamentally also be alternatively oriented at a different angle with respect to the longitudinal axis of the cavity 12.

As can also be seen in FIG. 2, according to the first exemplary embodiment, the cavity 12 is free of discontinuities, wherein the cross section of the cavity 12 defined transversely to its length (defined vertically in the view of FIG. 2) between its two ends in the illustrated exemplary embodiment Is essentially the same over the entire length between its two ends and widens only slightly towards the application opening 8, so that the opening cross section of the application opening 8 also approximately corresponds to the cross section of the cavity 12. The cavity 12 is preferably substantially in the form of a body of revolution having a circular or elliptical cross section; alternatively, however, it is also conceivable to provide the cavity 12 with a polygonal, preferably square or hexagonal, cross section. Thus, the chamber 14 forms a continuous tube having a constant cross section over almost its entire length, wherein the cavity is oriented in the direction of its length approximately transversely to the longitudinal extension of the housing 2 in the exemplary embodiment shown.

Furthermore, the cavity 12 is closed at its inner second end using a flexible membrane 18, preferably produced from silicone, which extends over the entire cross section of the cavity 12 and is driven by a drive device 22, which in the present exemplary embodiment has a drive motor 22 and a mechanism 22*a*. The mechanism 22*a* is designed in such a way that the rotational movement of the output shaft of the drive motor 22 is converted into a reciprocal longitudinal movement, which causes the membrane 18 to be set into a motion transversely to the plane spanned thereby, alternately in the direction of the application opening 8 and in the opposite direction thereto. In this way, the volume of the cavity 12 of the chamber 14 is changed in dependence on the rotation of the output shaft of the drive motor 22. The mechanism 22*a* preferably has an eccentric or a connecting rod in order to convert the rotational movement of the output shaft of the drive motor 22 into a reciprocal longitudinal movement for the reciprocal deflection of the membrane 18. The reciprocal movement of the membrane 18 causes a change in the volume of the cavity 12 between a minimum volume and a maximum volume according to its stroke (amplitude), wherein the change takes place repetitively at a frequency.

As can also be seen in FIG. 2, the drive motor 22, which in the exemplary embodiment described is an electric motor, is connected via an electrical cable 24 to an electronic control circuit board 26, which activates the drive motor 22. A battery 30 is connected to the control circuit board 26 via an electrical cable 28 and supplies the drive motor 22 and the control circuit board 26 with the necessary electrical energy.

The battery 30 can alternately either be a non-rechargeable battery or a rechargeable accumulator. While in the illustrated exemplary embodiment the drive motor 22 is located in the connecting area between the slim middle section 2*c* of the housing 2 and the first end section 2*a* of the housing 2 and thus adjacent to the head of the pressure wave massage device 1 formed by the first end section 2*a* of the housing 2 and the extension 4, the battery 30 is arranged in the second end section 2*b* of the housing 2, due to which the case 2 is well balanced when the pressure wave massager 1 is held by the user in the hand.

As can also be seen in FIGS. 1 and 2, an on/off button 32 is provided which may be actuated from the outside of the housing 2 to switch the pressure wave massage device 1 on and off and is arranged in the slim middle section 2*c* of the housing 2. Also in the slim middle section 2*c* of the housing 2, a button 34 to be actuated from the outside is arranged, using which various operating states of the pressure wave massage device 1 may be set, and an indicator lamp 36, preferably designed as a light-emitting diode and visible from the outside. The on/off button 32 and the button 34 are arranged directly on the control circuit board 26 fastened below the wall of the housing 2, while the indicator lamp 36 is connected to the control circuit board 26 via an electric cable (not shown in the figures).

In addition to activating the drive motor 22, the electronic control circuit board 26 also manages the charging of the battery 30 in the exemplary embodiment shown. For this purpose, the control circuit board 26 is connected via an electrical cable 38 to charging contacts 40, which are arranged on the end face of the second end section 2*b* of the housing 2 and are accessible from the outside, as may be seen in FIGS. 1 and 2. An external charger (not shown in the figures) may be connected to these charging contacts 40 via a plug having magnetic plug-in contacts, which can be brought into contact with the charging contacts 40 to establish an electrical connection due to magnetic forces.

The pressure wave massage device 1 described is designed as a hand-held device and for use is placed with the application opening 8 on a body part to be stimulated or an area surrounding the body part to be stimulated in such a way that this body part or this area is essentially enclosed by the edge section 6*c* of the socket 6 surrounding the application opening 8. In operation of the pressure wave massage device 1, the body part to be stimulated is then alternately subjected to different air pressures or a reciprocal air flow by the reciprocal movement of the membrane 18. The control circuit board 26 preferably has a memory (not shown in the figures), in which various modulation patterns are stored. A desired modulation pattern can be selected by operating the button 34 accordingly, in order then to activate the drive motor 22 accordingly.

In FIG. 3, a section 12*c* of the cavity 12 of a pressure wave massage device known from the prior art according to a second exemplary embodiment is shown schematically in longitudinal section, which differs from the above-described exemplary embodiment in that instead of a flexible membrane closing the inner end of the chamber 14, a piston 50 is arranged so it is reciprocally movable within the cavity 12, while the other components are implemented in the same way as in the first embodiment, so that in this regard reference is made to the previous description to avoid repetitions. The piston 50 is set into a reciprocal movement by the drive motor 22 via the mechanism 22*a* (similarly to the flexible membrane 18 in the first exemplary embodiment) along a section 12*c* of the cavity 12. The cross-sectional area of the cavity defined transversely to its length 12 remains essentially unchanged or at least nearly constant in terms of its size and shape over the length of the mentioned section 12*c*, and the piston 50 has a corresponding cross-sectional area. For this purpose, in the exemplary embodiment shown, the mentioned section 12*c* of cavity 12 has the form of a tube. In terms of its construction and function, the second exemplary embodiment is similar, for example, to a bicycle pump or a piston engine. The reciprocal movement of the piston 50 generates a pressure field with correspondingly varying pressures or a reciprocal air flow at the application opening.

FIG. 4 shows a pressure wave massage device known from the prior art according to a third exemplary embodiment in longitudinal section, which differs from the first exemplary embodiment according to FIG. 2 in the embodiment of the drive device 20, described in more detail below. With the exception of the thus different construction of the drive device 20, the third exemplary embodiment does not differ from the first exemplary embodiment, so that the same components are identified by the same reference signs and in this regard reference is made to the preceding description of the first exemplary embodiment to avoid repetitions.

Specifically, in the third exemplary embodiment shown in FIG. 4, the drive device 20 is designed as an electromagnetically operated linear drive. For this purpose, the drive device 20 in the exemplary embodiment shown has two stationary electromagnetic coil elements 21*a*, 21*b*, which are each designed as a cylindrical coil and are located one behind the other in a coaxial direction. The arrangement made up of the two stationary electromagnetic coil elements 21*a*, 21*b* contains a central cavity 21*c* which is open at both ends and which is enclosed by a circumferential inner wall 21*d* and is thus delimited. In the exemplary embodiment shown, the cavity 21*c* enclosed by the inner wall 21*d* has the form of a tube, which is preferably formed as a cylinder.

Inside the cavity 21*c*, a magnetic or magnetizable core 21*e* is arranged so it is reciprocally movable in the coaxial direction. The cross-sectional area of this cavity 21*c* defined transversely to its length is essentially unchanged or at least nearly constant in terms of its size and shape, and the core 21*e* has a corresponding cross-sectional area.

The core 21*e* is in turn coupled to the membrane 18. In FIG. 4, the core 21*e* and the membrane 18 are shown in the middle position. The two stationary electromagnetic coil elements 21*a*, 21*b* are activated and energized in such a way that the core 21*e* arranged within the arrangement of the two stationary electromagnetic coil elements 21*a*, 21*b* is set into reciprocal movement, which is correspondingly transmitted to the membrane 18. As can also be seen from FIG. 4, the stationary electromagnetic coil elements 21*a*, 21*b* are connected via the electrical cables 24 to the control circuit board 26, which activates and energizes the stationary electromagnetic coil elements 21*a*, 21*b* accordingly. In the exemplary embodiment shown, the core 21*e* is not provided with an electromagnetic coil, but rather consists of a solid body made of magnetic or magnetizable material such as rare earths.

In order to limit the stroke of the reciprocally moving core 21*e*, end magnets 23*a*, 23*b* are provided at both ends of the arrangement formed by the stationary electromagnetic coil elements 21*a*, 21*b*. The mutually facing ends of the core 21*e* and the end magnets 23*a*, 23*b* have the same magnetic polarity. As a result, a repulsive force generated by the end magnets 23*a*, 23*b* acts on the core 21*e* and increases as the core 21*e* comes closer. This has the result that the core 21*e* is decelerated by the electromagnets 23*a*, 23*b* until an opposite movement is applied thereto. Thus, the end magnets 23*a*, 23*b* act as magnetic impact elements. Alternatively, however, it is also conceivable to provide mechanical impact elements which are formed as stops against which the core 21*e* comes into contact and is thereby stopped in its further movement.

FIG. 5 schematically shows, in longitudinal section, an isolated view of an arrangement formed jointly by the drive device 20 and the cavity 12 of a pressure wave massage device known from the prior art according to a fourth exemplary embodiment, which differs from the above-described third exemplary embodiment according to FIG. 4 in that instead of a flexible membrane closing the inner end of the chamber 14, the reciprocally moving core 21*e* of the drive device 20 itself changes the volume of the chamber 14 formed by the cavity 12, while the other components are implemented in the same way as in the third exemplary embodiment, so that in this respect reference is made to the previous description of the third exemplary embodiment according to FIG. 4 in order to avoid repetitions. As is also apparent from FIG. 5, the inner wall 21*d*, which in the area of the arrangement of the two stationary electromagnetic coil elements 21*a*, 21*b* encloses the cavity 21*c* formed centrally there and accommodating the core 21*e*, is aligned with the inner wall 14*a* of the chamber 14 formed by the cavity 12. Therefore, the cavity 21*c* accommodating the reciprocally moving core 21*e* and the cavity 12 form a structural unit. This fourth exemplary embodiment, like the second exemplary embodiment, is similar in terms of its design and function to a bicycle pump or a piston engine, for example. The reciprocal movement of the core 21*e* thus generates a pressure field with correspondingly varying pressures or a reciprocal air flow at the application opening 8.

In addition, other types of drive are also conceivable in principle, which cause a deflection of the flexible membrane 18 according to FIGS. 2 and 4 or of the piston 50 according to FIG. 3 to change the volume of the cavity 12. This can also be done piezoelectrically, pneumatically, or hydraulically, for example.

Finally, other constructive solutions are also conceivable for changing the volume of cavity 12, such as making the side wall of cavity 12 flexible at least in sections instead of a membrane and compressing and expanding the cavity alternately at least at this point by external application. This alternative solution is also not shown in the figures.

In use, a distinction is made in particular between sealing operation, open operation, and so-called half-open operation, which generally applies to a pressure wave massage device of the type in question known from the prior art and thus similarly to the above-described exemplary embodiments.

During sealing operation, the socket 6 is placed on the body part to be stimulated in such a way that air exchange with the environment does not take place. In this operating state, pressure waves which change over time, preferably periodically, and act in the entire cavity 12 result due to the movement of membrane 18 according to FIGS. 2 and 4, the piston 50 according to FIG. 3, and the core 21*e* according to FIG. 5. The pressure waves are essentially isotropic and are thus also applied to the body part to be stimulated. Air flow essentially does not take place. Open operation is distinguished in that air is exchanged with the environment. In this operating state, the socket 6 is placed on the body part to be stimulated in such a way that the application opening 8 only partially encloses the body part to be stimulated and at least one gap-shaped intermediate space remains free between at least one section of the application opening 8 and at least one section of the body part to be stimulated, due to which air can escape from the cavity 12 into the environment.

In this operating state, air can also be sucked into cavity 12 from the environment, so that in this case there is a regular exchange of air.

Finally, a so-called half-open operation is also conceivable, in which, after the socket 6 has initially been completely placed on the body part to be stimulated or an area surrounding it, no excessively strong contact pressures are exerted, so that due to the flexibility of the body part to be stimulated or the area surrounding it, possible relative positive pressures can partially escape, while after a negative pressure arises in the cavity 12 upon movement of the membrane 18 according to FIGS. 2 and 4, the piston 50 according to FIG. 3, and the core 21*e* according to FIG. 5 in the direction away from the application opening 8 due to the resulting suction effect, the sections of the body part to be stimulated or the area surrounding it that have been opened by the positive pressure are drawn back to the edge section 6*d* of the socket 6 surrounding the application opening 8, thereby completely closing the application opening 8 again.

The pressure waves generated at the application opening 8, which form a pressure field made up of negative pressures and positive pressures alternating over time with respect to the ambient air pressure, or the reciprocal air flow generated at the application opening 8, have a wavelike profile that ideally corresponds to a sine curve, as shown in FIG. 6. The wavelike profile is characterized by an amplitude determined by the stroke of the flexible diaphragm 18 as shown in FIGS. 2 and 4, the piston 50 as shown in FIG. 3, and the core 21*e* as shown in FIG. 5, and by a frequency that is determined by the rate of change of the reciprocal movement of the flexible membrane 18 as shown in FIGS. 2 and 4, the piston 50 as shown in FIG. 3, and the core 21*e* as shown in FIG. 5. In addition, it should also be noted in this context that in practical operation, the profile of the pressure waves or the reciprocal air flow generated at the application opening 8 not rarely deviates from the ideal case of a sine curve shown in FIG. 6. In particular, in most cases the ratio of the difference values between the maximum amplitude value of the pressure (absolute value of the maximum positive pressure) or the air flow exit velocity and the ambient air pressure or the air flow velocity is different from zero in relation to the difference value between the minimum amplitude value (absolute value of the maximum negative pressure) or the air flow entrance velocity and the ambient air pressure or the airflow velocity. Thus, the zero line to be defined in the middle between the maximum and minimum amplitude values does not always represent zero ambient air pressure or air flow velocity. In particular, the half-open operation works more in the negative pressure range than in the positive pressure range, according to which the maximum absolute value of the negative amplitude in relation to the ambient air pressure is greater than the maximum absolute value of the positive amplitude in relation to the ambient air pressure.

In the pressure wave massage devices known from the prior art, which have been described above on the basis of various exemplary embodiments, pressure waves having alternating positive pressures and negative pressures in relation to the ambient air pressure or reciprocal air flows are generated at the application opening 8, by which a stimulation of the body parts to be stimulated is achieved.

In contrast, the solution according to the invention consists of modifying the known pressure wave massage devices in such a way that they work exclusively in the negative pressure mode.

For this purpose, according to a preferred exemplary embodiment of the invention, the socket 6 shown in FIGS. 2, 4, and 5 is replaced by the novel socket 60 shown in FIG. 7. FIG. 8 shows a detail illustration of the pressure wave massage device according to the first exemplary embodiment shown in FIG. 2 in the area of its head formed by the first end section 2*a* of the housing 2 and the extension 4, on which, however, instead of the socket 6 of FIG. 2, the novel socket 60 of FIG. 7 is arranged. Of course, the novel socket 60 can also be used instead of the socket 6 in the second to fourth exemplary embodiments previously described with reference to FIGS. 3 to 5. The illustration of FIG. 8 thus serves only as an example for the use of the novel socket 60 on known pressure wave massage devices. On the other hand, the other components are implemented in the same way as in the conventional pressure wave massage devices according to the exemplary embodiments described above with reference to FIGS. 1 to 5, so that in this respect reference is made to the previous description of the exemplary embodiments according to FIGS. 1 to 5 to avoid repetitions.

As can be seen in FIGS. 7 and 8, the socket 60, like the socket 6, has an outer section 60*a*, using which it is removably fastened on the extension 4, in that the outer section 60*a* of the socket 60 encloses a protruding section 4*a* of the extension 4 from the outside. Similarly to the socket 6, the socket 60 also has an inner section 60*b* and is provided with the application opening 8. The outer section 60*a* and the inner section 60*b* of the socket 60, similarly as in the socket 6, are connected to one another in the area of the application opening 8, where the socket 60 likewise has an edge section 60*c* surrounding the application opening 8. The inner section 60*b* of the socket 60 has an inner wall 60*d*, which opens into the edge section 60*c* surrounding the application opening. The inner or side wall of the cavity 12 outside of the socket 60 can preferably also consist of a substantially rigid material here. In the case of the socket 60, the application opening 8 also forms a plane with the peripheral edge section 60*d*, which in the exemplary embodiment shown is aligned essentially transversely with respect to the longitudinal axis (defined horizontally in the view of FIG. 8) of the cavity 12 when the socket 60 is arranged on the extension 4, wherein in principle the orientation can alternatively be oriented at a different angle in relation to the longitudinal axis of the cavity 12.

The special feature of the socket 60 is that it is provided with a first check valve arrangement 70 and a second check valve arrangement 80. In the exemplary embodiment shown, the first check valve arrangement 70 forms the inner end of the inner section 60*b* of the socket 60 which is arranged opposite to and remote from the application opening 8 and has a first check valve 72 and a flexible wall element 74. The flexible wall element 74 contains the first check valve 72 and closes the inner end of the inner section 60*b* of the socket 60. Due to the flexibility, the wall element 74 is resiliently mounted and reciprocally movable in the direction of and away from the application opening 8. The first check valve 72 is designed to close in the direction of the application opening 8 and to open in the direction away from the application opening 8 and thus in the direction of the membrane 18. In the illustrated embodiment, the first check valve is designed as a lip valve. Of course, other constructions are also conceivable for the first check valve, such as the design as an umbrella valve.

The cavity 12 is divided by the first check valve arrangement 70 into a first cavity section 12*a* located between the first check valve arrangement 70 and the membrane 18 and a second cavity section 12*b* located between the first check valve arrangement 70 and the application opening 8. The first cavity section 12*a* is delimited on one side by the first check valve arrangement 70 and is closed at its opposite other end by the membrane 18, while the second cavity section 12*b* is formed as the inner section 60*b* of the socket 60. For the case that the pressure field generating device is designed according to the second and fourth exemplary embodiments of conventional pressure wave massage devices described above with reference to FIGS. 3 and 5, the piston 50 or the core 21*e* is only accommodated by the first cavity section 12*a*. Since the wall element 74 is arranged sealed with the side wall of the cavity 12, the first check valve 72 provides the only fluid connection between the two cavity sections 12*a*, 12*b*.

The second check valve arrangement 80 includes a second check valve 82 which is arranged in the illustrated embodiment in the outer section 60*a* of the socket 60. The second check valve 82 communicates on the one hand with the environment and on the other hand via a channel 84 with the first cavity section 12*a*. As can be seen in particular in FIGS. 7*b* and 8, to form the channel 84 in the illustrated exemplary embodiment, an elongate, grooved recess is provided, which first extends from the second check valve 82 along the inside of the outer section 60*a* of the socket 60 and then along the outside of the inner section 60*b* of the socket 60 to the first cavity section 12*a* and is delimited in the installed state of the socket 60 by the protruding section 4*a* of the extension 4. The second check valve 82 is designed to open in the direction of the outside of the housing 2 and thus to the environment and to close in the direction of the channel 84 and thus of the first cavity section 12*a*. In the exemplary embodiment shown, the second check valve 82 is also designed as a lip valve, wherein of course other constructions such as the design as an umbrella valve can also be considered for the second check valve 82.

The socket 60 preferably consists of a soft or flexible plastic material such as a silicone material in particular. This not only offers advantages in terms of hygiene and flexibility in adapting to the body part to be stimulated or an area surrounding it during application, but also enables the socket 60 to be produced with the two check valve arrangements 70, 80 as an one-piece molded part and thus an one-piece component, wherein the flexibility or elasticity of such a material can be used advantageously to form the two check valves 72, 82 at the same time. Alternatively, however, it is also conceivable to form the socket 60 in one-piece with the extension 4 and thus as part of the extension 4, so that in this case the two check valve arrangements 70, 80 are also components of the extension 4.

Using the novel socket 60, a cyclic operation can be achieved with generation of a pressure field made up of minimum pressures and maximum pressures alternating over time exclusively in the negative pressure range. Each cycle can be divided into a first half of the cycle, in which the relative minimum pressures are generated in the second cavity section 12*b*, and a second half of the cycle, in which the relative maximum pressures are generated in the second cavity section 12*b*. Such a cycle is shown schematically in FIGS. 9*a* to *h*.

Figure 9:
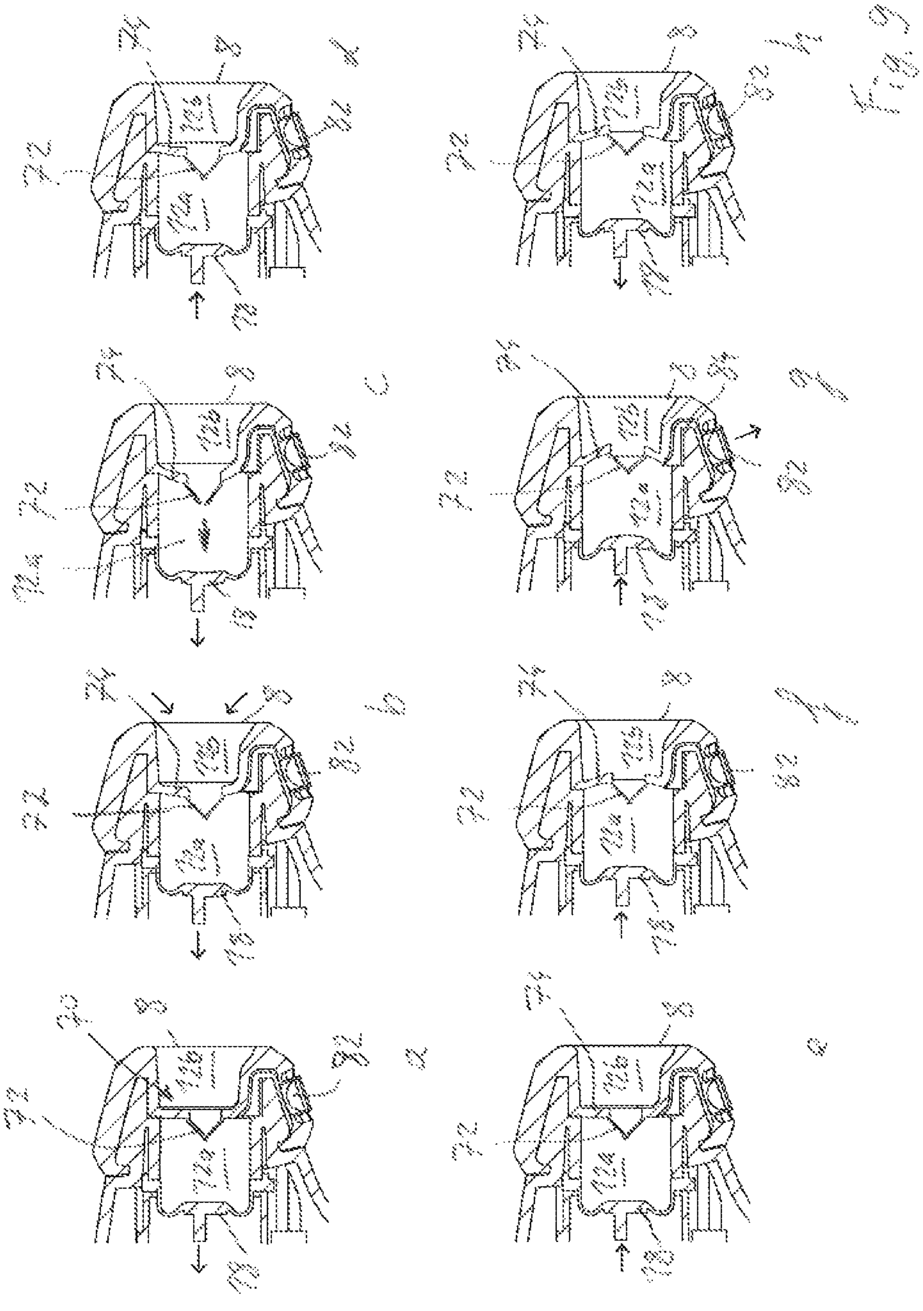

If, at the beginning of the first half of the cycle, the movement of the membrane 18 in the direction away from the first check valve arrangement 70 (FIG. 9*a*) causes the first cavity section 12*a* to be subjected to a negative pressure which, in this operating state, is lower than the pressure in the second cavity section 12*b*, this results in a movement of the flexible wall element 74 due to the suction effect in the direction of the membrane 18 (FIG. 9*b*) and, as the negative pressure continues to increase, the first check valve 72 also opens, through which part of the air in the second cavity section 12*b* is then sucked into the first cavity section 12*a* (FIG. 9*c*). This results in a negative pressure in the second cavity section 12*b*, in particular in sealing operation, i.e., when application opening 8 is placed with the edge section 60*c* of the socket 60 surrounding it, essentially forming a seal, on the body part to be stimulated or an area surrounding the body part to be stimulated. In this case, the second check valve 82 remains closed. The negative pressure occurring in the second cavity section 12*b* exerts a suction effect on the body part to be stimulated through the application opening 8 into the second cavity section 12*b*.

If, in the subsequent second half of the cycle, the diaphragm 18 reverses its movement and now applies positive pressure to the first cavity section, the first check valve 72 (FIG. 9*d*) closes. Furthermore, the flexible wall element 74 is now prevented from moving further in the direction away from the application opening 8 by the pressure building up in the first cavity section 12*a*, rather its movement is reversed again (FIG. 9*e*) and pressed in the direction of the application opening 8 (FIG. 9*f*). The increase of the pressure in the first cavity section 12*a* then additionally results in the opening of the second check valve 82 (FIG. 9*g*). Thus, part of the air in the first cavity section 12*a* is discharged to the outside via the open second check valve 82 and thereby pressure is released from the first cavity section 12*a*, which ultimately results in the elimination of the positive pressure that occurred briefly in the first cavity section 12*a*.

If the membrane 18 now reverses its movement again for the next cycle and subjects the first cavity section 12*a* to a negative pressure again, the second check valve 82 closes immediately and the first half of the next cycle begins again in the manner described above. Due to the negative pressure then building up in the first cavity section 12*a*, the flexible wall element 74 is again subjected to suction pressure and is thereby again subjected to a reverse movement in the direction away from the application opening 8 (FIG. 9*h*).

FIG. 10 shows the pressure profile after switching on the pressure wave massage device having the novel socket 60. FIG. 10 shows that an oscillating negative pressure field having substantially constant amplitude can result after only a few cycles.

In the same perspective as FIG. 8, FIG. 11 shows the head 4 of a pressure wave massage device provided with the socket 60, which, however, has a further modification according to the invention in relation to the exemplary embodiment shown in FIG. 8. This modification is that a venting pump 90 is also arranged inside the housing 2, the inlet 90*a* of which communicates with the second cavity section 12*b* via a venting hose 92. For this purpose, a venting opening 32*a* is shown schematically in FIG. 11 in the inner section 60*b* of the socket 60, to which the ventilation hose 92 is connected and which establishes a fluid connection between the venting hose 92 and the second cavity section 12*b*. Furthermore, an outlet hose 94 is provided, which connects the outlet 90*b* of the venting pump 90 to an outlet opening 94*a* provided in the outer wall of the housing 2. The task of the venting pump 90 is to vent the second cavity section 12*b* as much as possible at the beginning of the use of the pressure wave massage device at the time when it is placed with the application opening 8 on or over a body part to be stimulated or an area surrounding it, so that a noticeable initial negative pressure already occurs there. The air pumped out of the second cavity section 12*b* via the venting hose 92 is discharged to the environment by the venting pump 90 via the outlet hose 94 connected to its outlet 90*b* through the outlet opening 94*a*. For the supply of electrical energy, the venting pump 90 is connected via an electrical cable 96 to the control circuit board 26 shown in FIG. 2, which also controls the operation of the venting pump 90 at the same time.

In principle, the venting pump 90 can be switched on and off manually. However, it is more convenient to provide or program the control circuit board 26 with a time-dependent control which limits the operation of the venting pump 90 to a predetermined period of time after it has been switched on manually and then ends it automatically. It is even more convenient, in addition to the time-dependent switching off of the venting pump 90, to also automate its switching on, specifically using a sensor in particular. Such a sensor is shown schematically in FIG. 11 and is identified by the reference numeral "100". For the transmission and further processing of its signals, the sensor 100 is connected to the control circuit board 26 via an electrical cable 102.

A proximity sensor, for example, can be used as the sensor 100, which detects the distance of the socket 60 from the body part to be stimulated and emits a signal when the distance falls below a predetermined threshold value, so that when this signal is received, the control circuit board 26 switches on the venting pump 90. The threshold value is preferably zero, so that the ventilation pump 90 is only switched on automatically when the peripheral edge section 60*c* of the socket 60 touches the body part to be stimulated or an area surrounding it.

Alternatively, the sensor 100 can also be designed as a pressure sensor in order to detect the pressure within the second cavity section 12*b* and to emit a signal if the pressure is not below the prevailing ambient pressure. As long as this signal is applied, the control circuit board 26 activates the venting pump 90 and at the same time blocks the activation of the drive device 20. When the signal is no longer applied, i.e., the pressure in the second cavity section 12*b* has fallen below the ambient pressure, the control circuit board 26 switches the venting pump 90 off and the drive device 20 on.

Not only the switching on and off of the venting pump 90 can be controlled by the control circuit board 26, but also an automatic switching on of the drive device 20. In the mentioned time-dependent control of the venting pump 90, the drive device 20 can be switched on by the control circuit board 26 with a delay, specifically at the latest when the venting pump 90 is automatically switched off or, in order to avoid possible pressure losses in the second cavity section 12*b*, shortly before the venting pump 90 is switched off.

The invention claimed is:

1. A stimulation device for stimulating body parts having a pressure field generating device having a cavity having an application opening to be arranged or placed on or over a body part or an area surrounding the body part, wherein the cavity is delimited by a peripheral side wall, and a medium influencing arrangement acting on a gaseous and/or liquid medium located in the cavity designed to subject the gaseous and/or liquid medium to a stimulation profile acting at least in the application opening, which profile is distinguished by a change of a pressure of the gaseous and/or liquid medium that alternates over time, wherein the pressure forms a pressure field having minimum pressures and maximum pressures that alternate over time in relation to a reference pressure, and a drive device designed to drive the medium influencing arrangement in such a way that the change of the pressure is between the minimum pressures and the maximum pressures, wherein a first check valve arrangement is arranged within the cavity between the application opening and the medium influencing arrangement, sealed off with the peripheral side wall of the cavity, and is movable at least in sections in a direction to the application opening and away from the application opening and has a first check valve designed to close in the direction to the application opening and to open in a direction to the medium influencing arrangement, wherein the cavity has a first section located between the first check valve arrangement and the medium influencing arrangement and a second section located between the first check valve arrangement and the application opening, and wherein a second check valve arrangement connects the first section of the cavity to an outside of the stimulation device and has a second check valve designed to close in a direction to the first section of the cavity and to open in a direction to the outside of the stimulation device.

2. The stimulation device according to claim 1, wherein the first check valve and/or second check valve is a lip valve or an umbrella valve.

3. The stimulation device according to claim 1, wherein the stimulation device is valve free except for the first check valve and the second check valve.

4. The stimulation device according to claim 1, wherein the reference pressure is an atmospheric ambient pressure prevailing at a beginning of operation of the stimulation device.

5. The stimulation device according to claim 1, wherein the pressure field has a sinusoidal-periodic pressure profile in a steady state during operation of the stimulation device.

6. The stimulation device according to claim 1, wherein the first check valve arrangement has a wall element which is oriented at an angle to the peripheral side wall of the cavity, arranged in a sealed arrangement on the peripheral side wall of the cavity, designed to be movable at least in sections in the direction to the application opening and away from the application opening, and provided with the first check valve.

7. The stimulation device according to claim 1, wherein the first check valve arrangement and the second check valve arrangement together form an interchangeable one-piece component.

8. The stimulation device according to claim 1 wherein the second section of the cavity is designed as an interchangeable socket, which is provided with the first check valve arrangement and/or the second check valve arrangement.

9. The stimulation device according to claim 8, wherein the second section of the cavity is designed as an interchangeable socket which is provided with the second check valve arrangement and has a channel which connects the second check valve to the first section of the cavity.

10. The stimulation device according to claim 8, wherein the interchangeable socket has an inner side wall which forms a section of the peripheral side wall of the cavity leading to the application opening.

11. The stimulation device according to claim 8, wherein the interchangeable socket includes flexible material.

12. The stimulation device according to claim 8, wherein the interchangeable socket forms a one-piece component.

13. The stimulation device according to claim 1, wherein the medium influencing arrangement is designed as a volume changing element for changing the volume of the cavity.

14. The stimulation device according to claim 13, wherein at least one section of the peripheral side wall of the cavity delimiting the first section of the cavity is movable, the volume changing element includes the at least one movable section of the peripheral side wall of the cavity, and the drive device is designed to set the at least one movable section of the peripheral side wall of the cavity the movable side wall section into a reciprocal movement.

15. The stimulation device according to claim 14, wherein the cavity is provided with the application opening at a first end and is closed by the movable side wall section at a second end.

16. The stimulation device according to claim 13, wherein a core is movably arranged within the first section of the cavity and the volume changing element has the core or is formed by the core, wherein the core is reciprocally movable along the first section of the cavity and/or a cross section of the cavity defined transversely to a length of the cross section of the cavity is unchanged at least over the length of the first section of the cavity and the core has a corresponding cross section and/or the cavity has the form of a tube at least along the first section of the cavity.

17. The stimulation device according to claim 1, wherein the drive device has an electromagnetically operated linear motor having at least one stationary electromagnetic coil element and a magnetic or magnetizable core, which is reciprocally movable in relation to the at least one stationary electromagnetic coil element and is designed to drive the medium influencing arrangement.

18. The stimulation device according to claim 17, wherein at least one section of the peripheral side wall of the cavity is movable, and the magnetic or magnetizable core is designed to set the at least one movable section of the peripheral side wall of the cavity into a reciprocal movement.

19. The stimulation device according to claim 1, further comprising a venting pump designed to vent the second section of the cavity, which communicates with the second section of the cavity, and an outlet open to the outside of the stimulation device.

20. The stimulation device according to claim 19, further comprising: a proximity sensor designed to detect a distance of the application opening from the body part to be stimulated and to emit a signal when the distance falls below a predetermined threshold value, and a control device connected to the proximity sensor and the venting pump, the control device designed to activate the venting pump upon receiving the signal from the proximity sensor.

21. The stimulation device according to claim 19, further comprising a control device connected to the drive device and the venting pump and designed to activate the drive device only after activation of the venting pump with a delay of a predetermined period of time.

22. The stimulation device according to claim 19 further comprising: a pressure sensor designed to detect the pressure within the second section of the cavity and to emit a signal if the pressure is below a prevailing atmospheric ambient pressure, and a control device connected to the pressure sensor, the drive device, and the venting pump and designed to activate the drive device or to keep it activated only when the signal from the pressure sensor is present.

23. The stimulation device according to claim 19 further comprising: a pressure sensor designed to detect the pressure within the second section of the cavity and to emit a signal if the pressure is not below a prevailing atmospheric pressure, and a control device connected to the pressure sensor, the drive device, and the venting pump and designed to activate the venting pump or to keep it activated and to deactivate the drive device or keep it deactivated only when the signal from the pressure sensor is present.

24. The stimulation device according to claim 1, wherein the stimulation device is a hand-held device operated using a battery.

25. The stimulation device according to claim 1 comprising a socket, wherein the socket is removably arrangeable on or in a housing of the stimulation device, wherein the socket forms the second section of the cavity and is provided with the first check valve arrangement and/or the second check valve arrangement.

26. The stimulation device of claim 25, wherein the socket is provided with the second check valve arrangement having a channel which connects the second check valve to the first section of the cavity; and/or has an inner side wall which forms a section of the peripheral side wall of the cavity leading to the application opening; and/or includes flexible material; and/or forms a one-piece component.

* * * * *